United States Patent

[11] 3,629,024

[72] Inventors Yoshiaki Kimura;
 Yoshiharu Sano; Ryoji Kumazawa;
 Hisayasu Mitsui, all of Yokohama, Japan
[21] Appl. No. 11,984
[22] Filed Feb. 17, 1970
[45] Patented Dec. 21, 1971
[73] Assignee Tokyo Shibaura Denki Kabushiki Kaisha
 Horikawa-cho, Kawasaki-shi, Kanagawa-ken, Japan
[32] Priority Feb. 25, 1969
[33] Japan
[31] 44/13591

[54] METHOD OF INSULATING ARMATURE COILS
6 Claims, 2 Drawing Figs.

[52] U.S. Cl. .................................................. 156/56,
 156/185, 156/305, 156/330, 156/334, 310/208,
 174/120 SR
[51] Int. Cl. ......................................................... H01b 3/40,
 H01b 17/66
[50] Field of Search .......................................... 156/56,
 330, 334, 305, 185; 310/208; 174/120 R, 120 C,
 120 SR

[56] References Cited
UNITED STATES PATENTS

| | | | |
|---|---|---|---|
| 2,675,421 | 4/1954 | Dexter............................ | 174/117 |
| 2,707,204 | 4/1955 | Richardson et al. ........... | 156/56 X |
| 2,757,298 | 7/1956 | Botts et al. ..................... | 310/208 |
| 2,928,964 | 3/1960 | Jones.............................. | 310/208 |
| 3,079,519 | 2/1963 | Kitson et al. ................... | 156/185 X |
| 3,454,804 | 7/1969 | Ganger.......................... | 174/120 X |
| 3,458,389 | 7/1969 | Mertens ........................ | 156/330 X |
| 3,546,041 | 12/1970 | Burns et al..................... | 156/334 |

Primary Examiner—Carl D. Quarforth
Assistant Examiner—E. A. Miller
Attorneys—Robert E. Burns and Emmanuel J. Lobato ABSTRACT: Straight side portions of an armature coil adapted to be received in armature slots are insulated with insulating tapes containing a relatively hard and nonpliable epoxide resinous composition, while looped end portions are insulated with insulating tapes containing a relatively pliable long chain epoxide resinous composition to avoid damage to the insulation structure due to mechanical stress created during insertion of the coil into armature slots. Not only the interlayer insulation but also the ground insulation is formed by the above described two types of insulation tapes.

METHOD OF INSULATING ARMATURE COILS

BACKGROUND OF THE INVENTION

This invention relates to a method of insulating armature coils for electric machines and apparatus, more particularly formed armature coils for use in generators and motors of various capacities which can be disposed in slots of the core without damaging the coil insulation and have excellent tan δ-voltage characteristic and high insulating strength.

Armature coils for dynamoelectric machines of medium or higher capacities are formed in an oblong hexagonal or diamond configuration. Insulating tapes for insulating such coils are generally prepared by impregnating a varnish solution into mica flakes or mica paper (sometimes designated as mica mat) lined or backed with paper, cotton or glass cloth, glass fiber, nonwoven cloth or the like. Varnish solutions are prepared by dissolving a suitable insulating resin such as epoxide, polyester and silicone compound in an organic solvent such as toluene, xylene, methylethylketone, methylisobutyl-ketone, ether, cellusolve and the like. The tape is then wound about the coil. The coil sides, or straight portions of the coil which are to be received in armature slots should be precisely finished to have a generally rectangular cross section and flat sides. According to one method, side plates of metal or parchment paper are applied on four sides of the coil sides, and then tapes of heat shrinkable polyethylene or polyethylene-terephthalate are wrapped around the assembly. Then the heat is applied to cause the tapes to shrink to compress the insulation structure formed by the insulating tape to eliminate air voids between insulation layers. By the heat and pressure applied in this manner, the resin is caused to set to form a solid and integral insulation structure. According to another method, coils wrapped with insulation tapes of the above described type are vacuum impregnated with a low viscosity solventless-type resin and are then subjected to heat and pressure to form a void-free insulation structure. As coils insulated by this vacuum impregnation method have fewer voids, they are particularly suitable for use in high-voltage dynamoelectric machines without the risk of generating corona discharge.

As is well known in the art, armature windings are wound as lap windings, wave windings or chain windings, but generally the former two types are utilized. In the case of lap winding, the configuration of the coil is usually oblong hexagonal and two sides of different coils are received in each slot to form two-layered windings. When inserting hexagonal coils to form two-layered windings one side of the coil must be raised or held out of the slot whereby the coil ends are subjected to substantial mechanical stress, thus damaging the insulation. Especially in the case of high-voltage machines, the thickness of the ground insulation increases with the voltage. Moreover, the interlayer insulation should also be strengthened to withstand high surge or transient voltage. As the thickness of the insulation structure increases, damage thereof caused by lifting one side of the coil is increased. When inserting coils utilizing a thermosetting resin as the binder and the impregnating agent, the coils are heated to a temperature ranging from 70° to 90° C. to soften the resin thus alleviating damage to the insulation. However, in high-voltage coils this solution is not sufficient.

SUMMARY OF THE INVENTION

It is, therefore, an object of this invention to provide a novel method of insulating an armature coil of a dynamoelectric machine having straight side portions adapted to be received in armature slots of the machine and looped end portions extending beyond the armature slots.

A more specific object of this invention is to insulate the looped end portions with pliable insulation structures so as to minimize degradation thereof due to mechanical stress applied to the coil when it is placed in the armature slots.

A further object of this invention is to provide an armature coil for a dynamoelectric machine with its straight side portions insulated with rigid insulation structures which can be accurately formed to the desired configuration and with its looped end portions insulated with pliable insulation structures.

According to this invention straight side portions of the armature coil are insulated with insulating tapes containing an epoxide resinous composition having a relatively high softening point or relatively low pliability, whereas looped end portions of the coil are insulated with insulating tapes containing another epoxide resinous composition having a relatively low softening point or relatively high pliability.

As the first epoxide resinous composition of low pliability, any one of many well-known epoxide resins available on the market can be used. However, as the second epoxide resinous composition of high pliability, we use a long-chain epoxide resin prepared by reacting epichlorohydrin with a member selected from the group consisting of a mixture of a major proportion of dimer acid and a minor proportion of trimer acid; polyazelaic polyanhydride

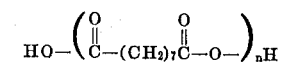

for example, Emily–3455–DPAPA (sold by Emily Co.); and α,ω-polybutadiene dicarboxylic acid

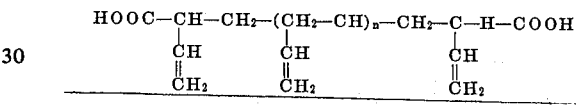

for example, NISSO–PB (c) (sold by Nippon Soda Co., Ltd., Japan).

These long-chain epoxide resins are characterized by their high pliability and excellent electrical characteristics after curing process.

After forming interlayer insulations, a ground insulation may be formed with the above described two types of insulator tapes on the interlayer insulation, and the ground insulation is then impregnated with a solventless epoxide resinous composition. Thereafter, the coil is heated to cure epoxide resinous compositions.

DESCRIPTION OF THE PREFERRED EMBODIMENTS

Figure 1:
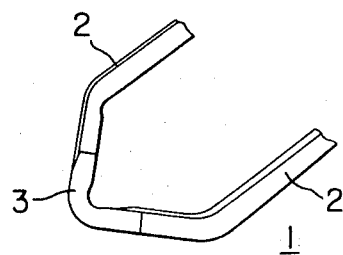
FIG. 1 is a perspective view of a portion of an armature coil embodying this invention and FIG. 2 shows characteristic curves to show the pliability of the resin utilized in this invention.

As diagrammatically shown in FIG. 1, an oblong hexagonal armature coil 1 for use in dynamoelectric machines includes a pair of parallel straight side portions 2 which are to be received in armature slots and looped end portions 3 interconnecting the opposite ends of straight side portions 2. According to this invention, the looped end portions are insulated with insulating tapes impregnated with an epoxide resin binder which softens at a relatively low temperature, whereas straight side portions 2 are insulated with insulating tapes impregnated with an expoxide resin binder which softens at a relatively high temperature. Thereafter, the insulated coil is vacuum impregnated with a suitable impregnating compound and the coil is then heated under pressure to set the resin and compound.

Generally, an epoxide resin is extremely hard and brittle after setting. To impart pliability to the insulation structure impregnated with epoxide resin, it has been proposed to incorporate a thermoplastic resin to epoxide or to employ aminoethylpiperazine, polyamide, etc., as the curing agent. However, when the epoxide resin is made pliable in this manner, its electrical characteristics are degraded.

According to this invention this problem is solved by using a long-chain pliable epoxide resinous composition mentioned above.

The details of the method of insulating armature coils is as follows:

Two types of mica tapes are prepared for forming coil insulations. One is used for insulating straight side portions and is prepared by applying onto a thin insulation substrate a resinous composition consisting of an epoxide resin such as Epicoat 828 or Epicoat 1001 (sold by Shell Chemical Limited, U.S.A.), a hardening agent such as hexahydrophthalic anhydride (HHPA) or malenized linseed oil and a curing catalyst such as benzyldimethylamine (BDMA). The coated substrate is then heated to semicured state. The insulating tape thus obtained has excellent electrical and mechanical characteristics. The other insulating tape is used for insulating looped end portions and comprises a mica paper or mat lined with a sheet of paper or nonwoven cloth which can be elongated to some extent and a semicured resinous composition consisting of Epicoat 1001, a flexible long-chain epoxide resin such as Epicoat 871 (sold by Shell Chemical Limited, U.S.A.), a hardening agent such as HHPA or dodecyl succinate anhydride (DDSA) and a curing catalyst such as BDMA. The last mentioned resinous composition begins to soften at a temperature of from 30° to 50°c., whereas the former begins to soften at a temperature of 80° C., as will be described with reference to FIG. 2.

The mica tape of the second type is then wrapped around the looped portions 3 of the coil, and that of the first type around the remaining portions of alternate turns or entire turns of the coil (including straight side portions 2) to form a so-called interlayer insulation. Each tape is wrapped for a required number of convolutions with half-lap joints. In the second step the ground insulation is formed on the interlayer insulation by wrapping the second mica tape about looped portions while wrapping the first mica tape about the remaining portions of the coil, each for a required number of convolutions with half-lap joints depending upon the voltage to the ground. To decrease electrical vulnerability and to make easy the wrapping operation of the joints between looped portions and other portions of the coil, tape laminations are stepped. In the third step, the insulated armature coil is placed in an impregnating tank and is then subjected to an preliminary drying process under vacuum. Then in the third step the coil insulation is impregnated under vacuum with a solventless epoxide resin composition of low viscosity (2 to 7 poise) and long pot life, and the resinous compositions are caused to cure by heating at a temperature of 120° to 160° C. for 15 to 30 hours, under pressure. The resinous composition of the impregnating varnish utilized in the third step consists of DX-200 (sold by Shell Chemical Limited), a monoepoxide compound, e.g., benzyl glycydylether and a hardening agent such as malenized linseed oil and HHPA. In carrying out this invention, in order to impart sufficient pliability to the looped end turns of the coil, it is important to increase the quantity of the binder for bonding the mica tape to a value several times that of the binder for the tape used to insulate other portions. This prevents impregnation of the looped portions with the impregnating resinous composition which is of less pliability and used during the the third step, thus preserving the high pliability of the mica tape. As the backing material for the mica tape, ordinary glass cloth is not suitable for the tape utilized to insulate the looped portions because glass tape has small elongation so that it cannot relieve the stress concentrating at the looped portions when one side of the coil is raised. However, where especially high mechanical strength is required, bias cut glass tape may be used. Generally, paper and nonwoven cloth are preferred.

The insulation structure obtained in this manner is a void-free solid integral structure, and the insulation strength thereof is not degraded by the mechanical handling of the coil required for placing it in the armature slots. Moreover, the novel insulation structure has excellent tan δ-voltage characteristic and large breakdown strength. Thus, this invention is especially suitable for insulating armature coils for use in high-voltage, large-capacity dynamoelectric machines.

The following specific examples are given by way of illustration and are not to be construed as limiting in any way the scope of the invention. All parts are by weight.

Example 1

Eighty-seven parts of Epicoat 1001, 67 parts of Epicoat 871 which is a long-chain epoxide composition, 55 parts of HHPA and 0.2 part of BDMA were dissolved in a solvent consisting of 146 parts of toluene and 63 parts of MIBK to prepare a varnish. The varnish was then caused to impregnate a thin mica tape lined with a thin nonwoven cloth to prepare a tape A for insulating looped portions or end turns of the armature coil, said tape A containing 15 percent, by weight, of resinous composition in the case of mica flakes and 50 percent, by weight, in the case of a mica mat. Then 15 parts of Epicoat 828, 30 parts of Epicoat 1001, 15 parts of malenized linseed oil, 10 parts of HHPA and 0.2 part of BDMA were dissolved in 70 parts of MIBK to obtain a varnish. This varnish was used to impregnate a thin mica insulating tape to prepare a tape B for insulating remaining portions of the coil, said tape B containing 12 percent, by weight, of resinous composition in the case of mica flakes and 20 percent, by weight, in the case of a mica mat.

In the first step, the tape A was wrapped about the looped portions of the coil and the tape B about the remaining portions of the coil to form a continuous interlayer insulation.

In the second step, the tape A was wrapped with several turns about the portion of the interlayer insulation around the looped portion, and tape B was wrapped with several turns about remaining portions of the interlayer insulation to form a ground insulation. According to the usual practice, a plurality of rectangular strands with thin turn insulations are stacked in two rows, and the stack is wrapped with tape A or B to form interlayer insulation. At least two such stacks with interlayer insulations are superposed on each other, and tape A or B is wrapped around the superposed assembly to form the ground insulation. It is advantageous to form the ground insulation by alternate layers of tapes of mica flakes and tapes of mica mat.

In order to avoid electrical vulnerability, joints between insulations around the looped portions and remaining portions were stepped.

In the third step, a solventless epoxide resinous composition for impregnation was prepared by admixing 120 parts of HHPA as a hardening agent, 40 parts of malenized linseed oil, 40 parts of butylglycidylether, and 120 parts of DX-200 (sold by Shell Chemical Limited). The impregnating composition has a viscosity of 150 centipoise. The armature coil prepared by the first and second steps was vacuum impregnated with this impregnating composition in an impregnation tank, and the impregnated coil was then cured under pressure by heating it to a temperature of 150° C. for 25 hours.

Example 2

In this example, tape A of example 1 is prepared by substituting 95 parts of DDSA for HHPA to function as the hardening agent. This modified composition is more pliable as shown by curve $a$ of FIG. 2 than that of example 1 (curve $b$).

This modified tape was used to insulate looped portions of the coil. In this case, however, only a mica mat tape was used to form the ground insulation. In the third step, a solventless resinous composition consisting of 20 parts of Epicoat 828, 25 parts of butylglycidylether and 57 parts of HHPA was used to vacuum impregnate the coil, and the impregnated coil was cured by heating it to a temperature of 150° C. for 25 hours.

Figure 2:
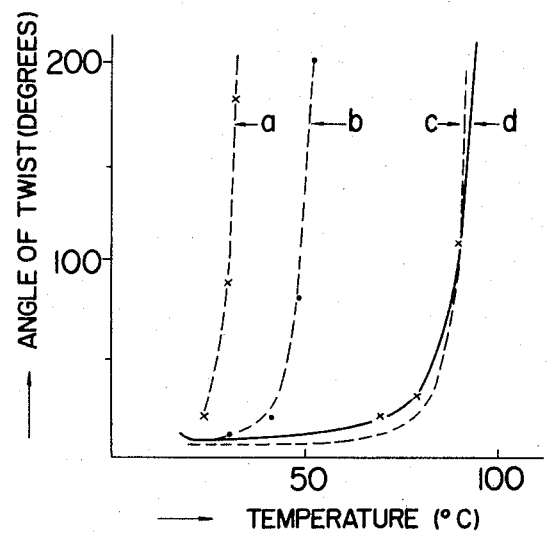

The pliabilities of various resinous compositions are indicated in FIG. 2, in which the ordinate represents the angle of twist in degrees and the abscissa the temperature in degrees Centigrade. Curve $a$ represents the pliability of the resinous composition of example 2 for use in preparing a mica tape for insulating the looper portions, and curve b that of the resinous composition of example 1 for use in preparing a mica tape for insulating the looped portions. Curve c represents the pliability of the resinous composition for a tape utilized to insulate the other portions of the coil, and d that of the solventless impregnating resinous composition.

Example 3

Process of example 1 was repeated except that a pliable mica tape was prepared by using a resinous composition consisting of 335 parts of Epicoat 1001, 80 parts of HHPA and 20 parts of a long-chain polyazelaic polyanhydride sold under a trade name PAPA and employed to increase pliability.

Example 4

PAPA utilized in example 3 was substituted by an equivalent acid value quantity of $\alpha,\omega$-polybutadiene dicarboxylic acid sold under a trade name of NISSO–PB (3) by Nippon Soda Co., Limited, Japan, and the resulted resinous composition was used to prepare a pliable mica tape which was used in the same manner as in example 1..

For comparison coils with their looped portions insulated with an insulating tape containing a pliable epoxide resinous composition, for example, Epicoat 781 prepared by reacting a mixture of acids consisting of a major proportion of long-chain dimer acid and a minor proportion of trimer acid with epichlorohydrin or a modified epoxide resinous composition, wherein said acid components were substituted by a long-chain acid such as polyazelaic polyanhydride or $\alpha 5$ $\omega$-polybutadiene dicarboxylic acid and conventional coils with their all portions insulated with the same resinous composition were prepared and these coils were subjected to coil raise tests.

In the prior art armature coils the breakdown strength per 2 mm. of the insulation structure was decreased to 60 to 75 kv. after coil raise from 90 to 95 before coil raise, whereas that of the coils insulated according to this invention was about 90 kv. before and after coil raise. This was caused by the concentration of the stress at the looped portions when the coil was raised or bent up thus forming small cracks in the insulation structure. On the other hand, according to this invention since the looped portions are insulated by a pliable insulation structure, as the upper coil is bent upwardly, the insulation structure of the loop portions can bend just like the upper coil conductor to absorb the stress. Although slight changes occurs in the insulation structure on the looped portions such a slight change does not result in any appreciable change in the electrical characteristics.

Heretobefore, the quantity of the resinous composition for bonding mica was made higher at the looped portions than at the remaining portions. For example, the quantity of the resinous composition at the looped portions was 50 percent, by weight, for mica mat, or 15 percent for mica flakes whereas that of the resinous composition at the remaining portions was 20 percent for mica mat or 12 percent for mica flakes. In coils with its entire portions insulated with mica tapes containing 20 percent of the resinous composition for mica mat or 12 percent for mica flakes, the pliability of their insulation structure was lost by the impregnating resin and its breakdown strength was decreased to 70 to 80 kv. In contrast, in this invention use of much more quantity of the resinous composition at the looped portions than other portions results in higher pliability without loss of insulating strength.

Further, the result of test showed that the electrical characteristics of the insulation structure for the looped portions are substantially the same whether it is formed by a mica tape containing mica mat or by alternate tapes of mica mat and mica flakes. This is important when one considers that flake mica tape can be impregnated with at most 20 percent of the resinous composition whereas mica mat tapes with up to 60 percent of the resinous composition. Moreover, mica mat tapes are more excellent and of more uniform quality than mica flake tape, are easier to apply and have higher insulating strength.

Coils insulated in accordance with this invention are applicable to machines having more than four coils.

We claim:

1. A method of insulating an armature coil including straight side portions adapted to be received in armature slots of a dynamoelectric machine and looped end portions extending beyond said armature slots, said method comprising the steps of applying a first insulating tape containing a first epoxide resinous composition having a relatively high softening point around at least said straight side portions of the coil, applying a second insulating tape containing a second long-chain epoxide resinous composition more pliable than said first epoxide resinous composition around said looped end portions, impregnating an insulation structure formed by said first and second insulating tapes with a solventless epoxide resinous composition, and heat curing said epoxide resinous compositions.

2. A method of insulating an armature coil including straight side portions adapted to be received in armature slots of a dynamoelectric machine and looped end portions extending beyond said armature slots, said method comprising the steps of applying a first insulating tape containing a first epoxide resinous composition having relatively high softening point around at least said straight side portions of the coil to form a first interlayer insulation, applying a second insulating tape containing a more flexible epoxide resinous composition than said first epoxide resinous composition around said looped end portions to form a second interlayer insulation contiguous to said first interlayer, the joints between said first and second interlayer insulations being stepped, applying said first insulating tape around said first interlayer insulation and applying said second insulating tape around said second interlayer insulation whereby to form a continuous ground insulation, impregnating said ground insulation with a solventless epoxide resinous composition, and heat curing said epoxide resinous compositions.

3. The method according to claim 1 wherein the softening point of said first epoxide resinous composition is about 30° to 50° C. whereas that of said second epoxide resinous composition is about 80° C.

4. The method according to claim 1 wherein comprises a long-chain epoxide composition prepared by reacting epichlorohydrin with an acid composition consisting of dimer and trimer acids.

5. The method according to claim 4 wherein the quantity of said trimer acid is smaller than that of said dimer acid.

6. The method according to claim 1 wherein said second epoxide resinous composition comprises a long-chain epoxide composition prepared by reacting epichlorohydrin with an acid component selected from the group consisting of polyazelaic polyanhydride and $\alpha, \omega$-polybutadiene dicarboxylic acid.

* * * * *